United States Patent [19]

Miyayama et al.

[11] Patent Number: 5,297,287
[45] Date of Patent: Mar. 22, 1994

[54] SYSTEM AND METHOD FOR RESETTING A MICROPROCESSOR SYSTEM

[75] Inventors: Yoshiyuki Miyayama, Santa Clara, Calif.; Akira Nakada, Suwa, Japan; Jun Nakamura, Shimosuwa, Japan; Shoichiro Kasahara, Suwa, Japan

[73] Assignee: S-MOS Systems, Incorporated, San Jose, Calif.

[21] Appl. No.: 844,494

[22] Filed: Mar. 2, 1992

[51] Int. Cl.$^5$ .............................. G06F 1/24
[52] U.S. Cl. ................... 395/700; 364/DIG. 1; 364/280.3
[58] Field of Search .......... 364/DIG. 1 MS File; 395/700, 775

[56] References Cited

U.S. PATENT DOCUMENTS 4,378,588  3/1983  Katzman et al. ............. 364/DIG. 1
4,403,288  9/1983  Christian et al. ............ 364/DIG. 1
4,799,140  1/1989  Dietz et al. ................. 364/DIG. 1

OTHER PUBLICATIONS

Patent Abstracts of Japan, Publication No. JP63067004, Published Mar. 25, 1988, Abstract vol. 12, No. 291, Publshed Aug. 9, 1988.
Patent Abstracts of Japan, Publication No. JP1177830, Published Jul. 14, 1989, Abstract vol. 13, No. 459, Published Oct. 17, 1989.

Primary Examiner—Thomas M. Heckler
Attorney, Agent, or Firm—Sterne, Kessler, Goldstein & Fox

[57] ABSTRACT

The present invention provides a reset circuit with two different threshold input voltages. The reset circuit of the present invention is located within a processor, and is designed to control the reset functions of both the processor and the chips located peripheral to the processor. The reset circuit includes a first buffer with a first threshold voltage level. The input of the first buffer is connected to a reset signal and the output of the first buffer is connected to control the reset function of at least one chip that is peripheral to the processor. A second buffer is provided with a second threshold voltage level that is higher than the first threshold voltage level. The input of the second buffer is connected to the reset signal and the output of the second buffer is connected to control the reset function of the processor. The reset circuit guarantees that the processor is reset after the peripheral chips subsequent to power up.

6 Claims, 5 Drawing Sheets

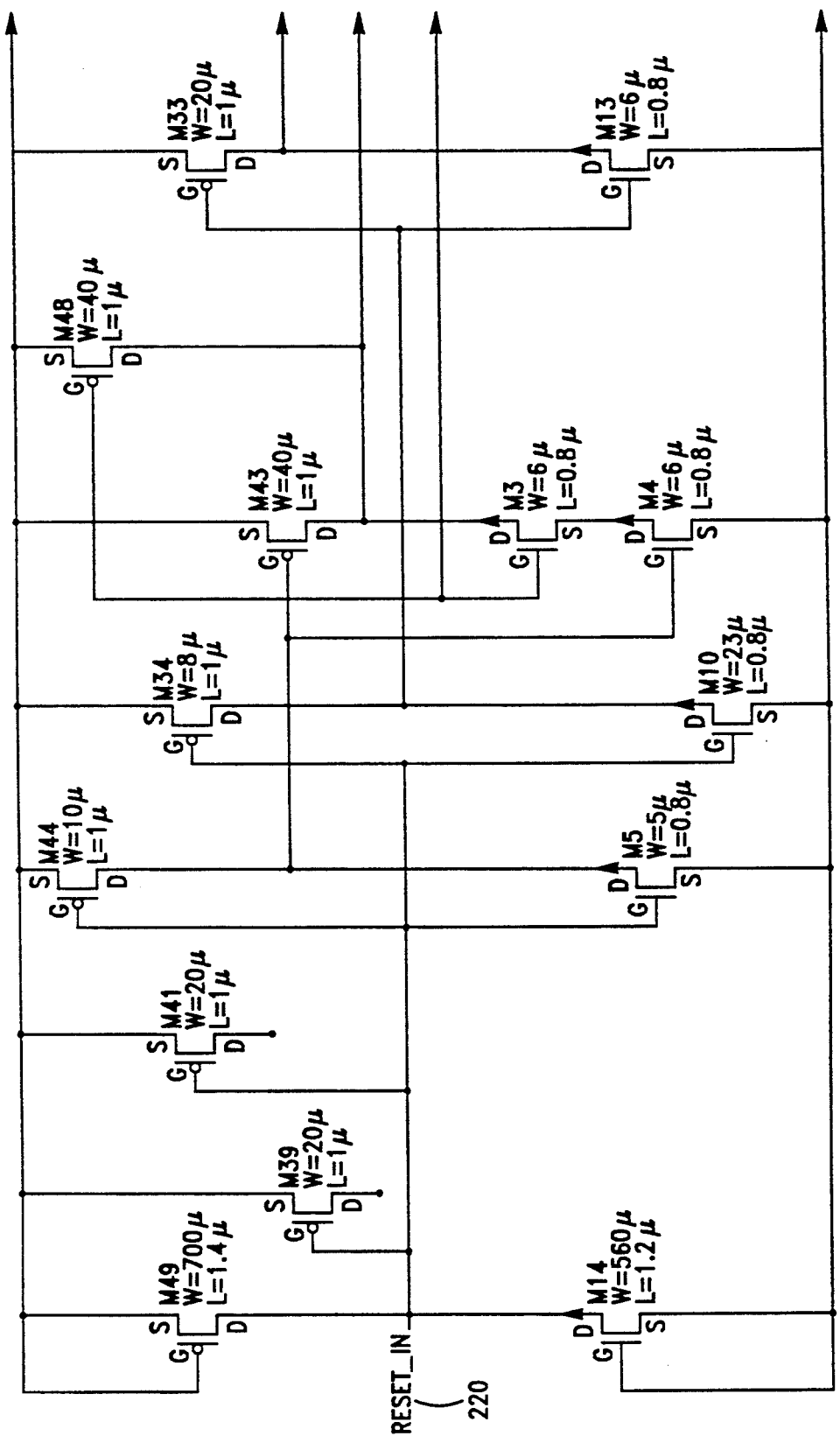
FIG.—4A

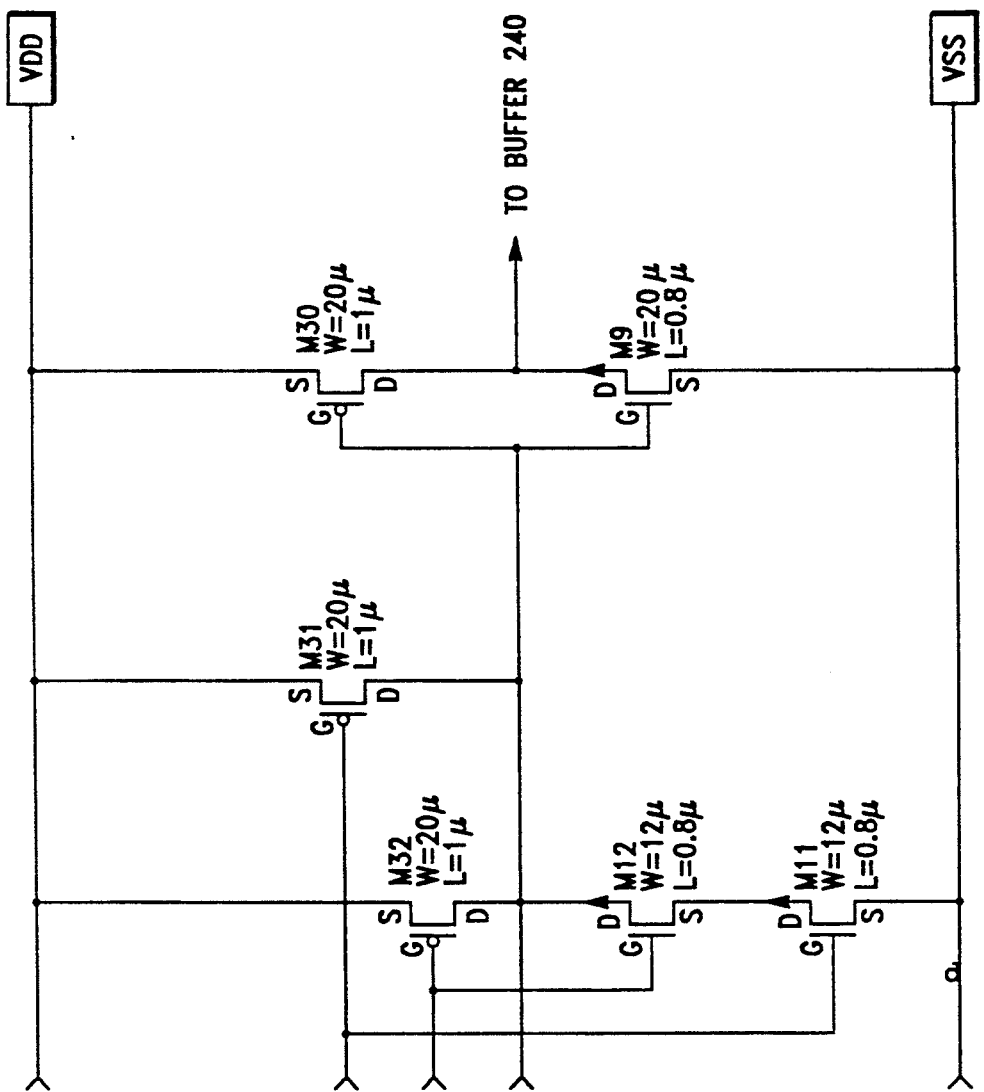
FIG.—4B

SYSTEM AND METHOD FOR RESETTING A MICROPROCESSOR SYSTEM

BACKGROUND OF THE INVENTION

1. Field of the Invention

The present invention relates generally to the field of microprocessor systems, and more particularly, to a reset circuit for a microprocessor system.

2. Discussion of Related Art

All computer systems have some type of reset circuit. The purpose of the reset circuit is to initialize a CPU's internal storage locations (e.g., the general state of the machine). Typically during a reset operation, all registers are set to zero, the interrupt system is disabled, the input/output interface is initialized, and the program counter is set to some initial value. The terms reset, power up (from a cold or warm start), and boot are used interchangeably throughout this document. Typically, the reset signal is generated external to the CPU.

It is extremely important that the system designer design the system to guarantee that the CPU starts last after the reset pin becomes inactive. Once the reset funtions of the CPU begin, the CPU is initialized to some predetermined state and a defined sequence of events begins. It is essential that all the chips peripheral to the CPU initialize before the CPU is allowed to access their memory locations; otherwise, the CPU will be accessing invalid data.

SUMMARY OF THE INVENTION

The present invention provides a reset circuit with two different threshold input voltages. The reset circuit of the present invention is located within a processor, and is designed to control the reset functions of both the processor and the chips located peripheral to the processor. The reset circuit includes a first buffer with a first threshold voltage level. The input of the first buffer is connected to a reset signal and the output of the first buffer is connected to control the reset function of a least one chip that is peripheral to the processor. A second buffer is provided with a second threshold voltage level that is higher than the first threshold voltage level. The input of the second buffer is connected to the reset signal and the output of the second buffer is connected to control the reset function of the processor. The reset circuit guarantees that the processor will start working after the peripheral chips subsequent to power up.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 4, consisting of 4A and 4B, is a schematic diagram of buffer 250; and

DETAILED DESCRIPTION

Figure 1:
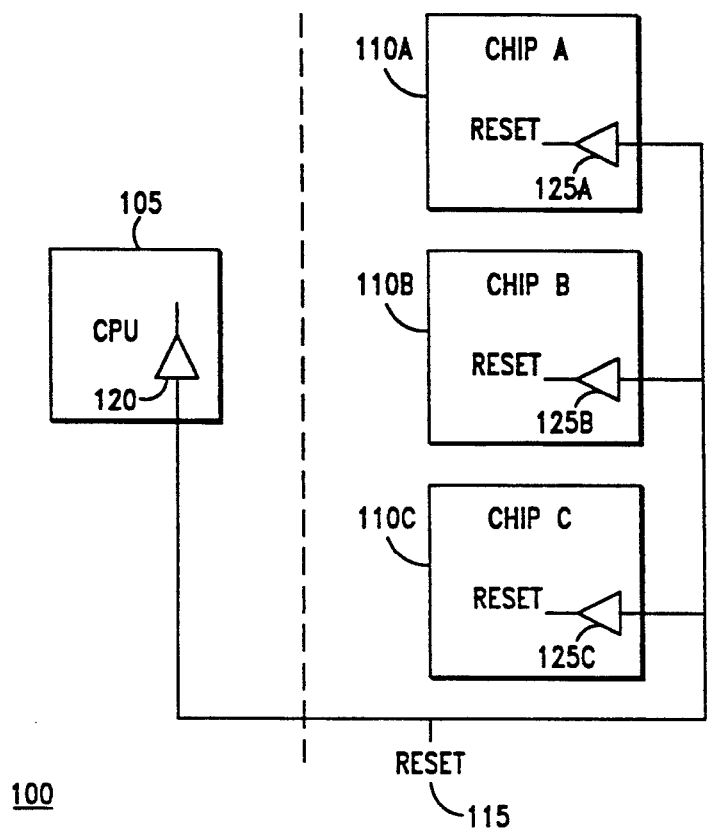
FIG. 1 is a general illustration of the conventional means for resetting a system architecture comprising CPU 105 and a plurality of chips 110 peripheral to CPU 105.

FIG. 1 illustrates a conventional means for resetting a system architecture comprising a CPU 105 and a plurality of chips 110a, 110b, and 110c peripheral to CPU 105. CPU 105 has only one reset pin 115 which has a single threshold input voltage. The chips 10 peripheral to CPU 105 also have a single reset pin 115 with a single threshold voltage. However, each peripheral chip 110 has a buffer 125 with a threshold input voltage that is lower than the threshold input voltage associated with buffer 120.

This type of conventional setup allows the peripheral chips 110 to be reset before CPU 105 is reset. If the peripheral chips 110 need to be replaced or a design change is required, then only a chip that has a reset circuit with a lower threshold voltage than the CPU can be coupled to the system. However, it can not be guaranteed that an off-the-shelf chip used to replace a chip 110 will have a reset circuit with a threshold voltage that is less than the threshold voltage associated with the CPU.

Figure 2:
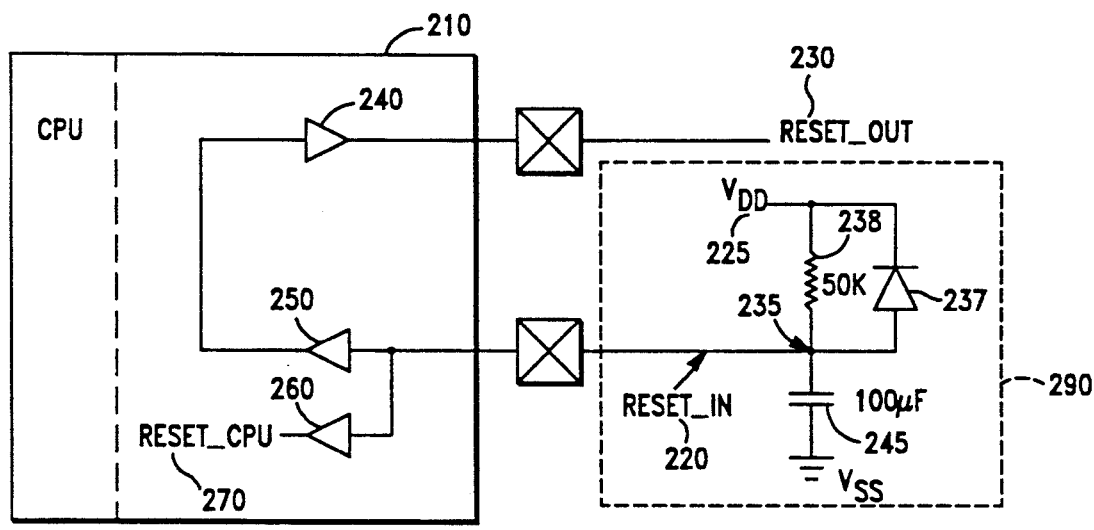
FIG. 2 is a detailed schematic of a reset circuit 200 of the present invention.

FIG. 2 shows a reset circuit 200 of the present invention which is located in processor 210. Reset circuit 200 starts or restarts processor 210. The present invention uses a pair of buffers that have two different threshold input voltages. The threshold voltage is defined as the voltage at which the transistors begin to conduct ("turn on") to supply power to their output for Initialization. For a more detailed description of threshold voltages and/or transistor characteristics see Weste et al., *Principles of CMOS VLSI Design a Systems Perspective*, Addison-Wesley chapter 2 (reprinted 1988).

RESET_IN 220 is the input pin for the reset signal. The reset signal of a preferred embodiment of the present invention is active low. RESET_CPU 270 is the signal which will initialize processor 210 itself. RESET_OUT 230 is the output of processor 210 to initialize the chip(s) peripheral to processor 210 (e.g., printing video controller (PVP), interrupt controller, cache control unit (CCU), I/O control unit (IOU)). To assure later turn on of processor 210, buffer 250 has a lower threshold voltage then buffer 260. Since the threshold voltage of buffer 250 is lower than buffer 260, RESET_OUT 230 becomes active earlier than RESET_CPU 270. Consequently, the outside peripheral chips are reset earlier than processor 210.

Circuit 290 which is located external to processor 210, includes a 100μF capacitor 245, a 50KΩ resistor 238 and a diode 237. The operation of circuit 290 is well known to those skilled in the art; however, the operation as it directly pertains to the present invention is described below.

When power up occurs $V_{dd}$ 225 goes high. The voltage that initially appears at a node 235 is relatively low because of capacitor 245. As the capacitor slowly charges, the voltage level at node 235 slowly increases. The voltage at node 235 is equal to the voltage level at the inputs of buffers 250 and 260.

Figure 3:
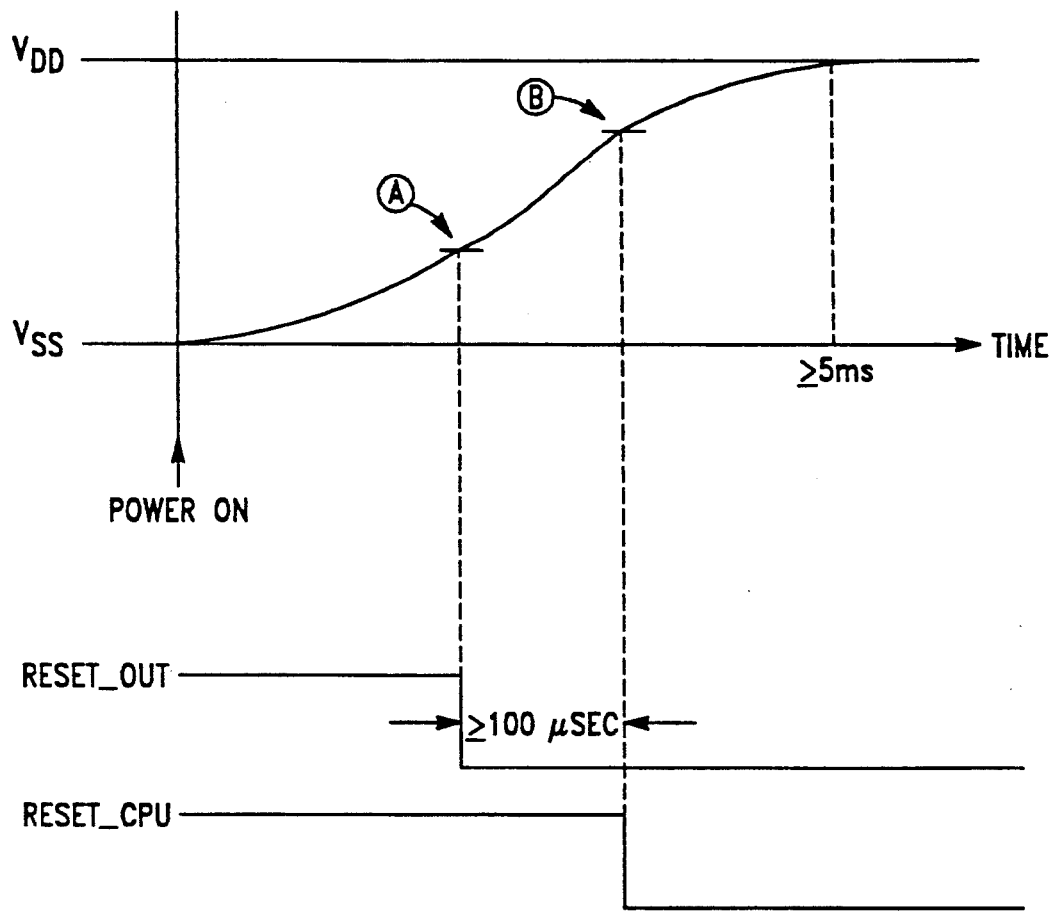
FIG. 3 is a timing diagram which illustrates the switching characteristics of the two different threshold input voltages associated with buffers 250 and 260.

This is generally illustrated in FIG. 3. As the voltage at node 235 increases, it will trigger buffers 250 and 260, which in turn will reset the peripheral chips and processor 210, respectively. When the voltage reaches point A, the threshold voltage level of buffer 250 is reached. Thus, buffer 250 is activated and RESET_OUT 230 goes low to initialize the peripheral chip(s). When the voltage reaches point B, the threshold voltage in buffer 260 is reached and buffer 260 is activated. RESET_CPU 270 goes low at this point to initialize processor 210.

The preferred embodiment allows a minimum of 100 μsec between activating buffer 250 and activating buffer 260. The present invention, however, is in no way limited to the timing shown in connection with this example, as will become evident to those skilled in the art. As indicated above, the preferred embodiment is active low. Thus, once RESET_OUT 230 and RESET_CPU 270 go low, the reset function of the peripheral chips and processor 210, respectively, begin to operate.

Buffer 240 is for isolation and increased fan-out so that buffer 250 can drive more chips connected to pin 230. The structure and operation of buffer 240 is well known to those skilled in the art.

In addition, since the entire reset circuit is located within processor 210, the system guarantees that processor 210 will be reset last. The threshold voltages of buffers 250 and 260 are set at fabrication time, and thus replacing a chip(s) peripheral to processor 210 in no way impacts on the operation of reset circuit 200.

It should be noted that, although the above discussion is in relation to a processor 210 and peripheral chips attached via a reset pin 230, the teachings of the present invention can be expanded to include any system that requires a first set of one or more devices (i.e., chips or architectural blocks) to be turned on or off before a second set of one or more devices.

Figure 5:
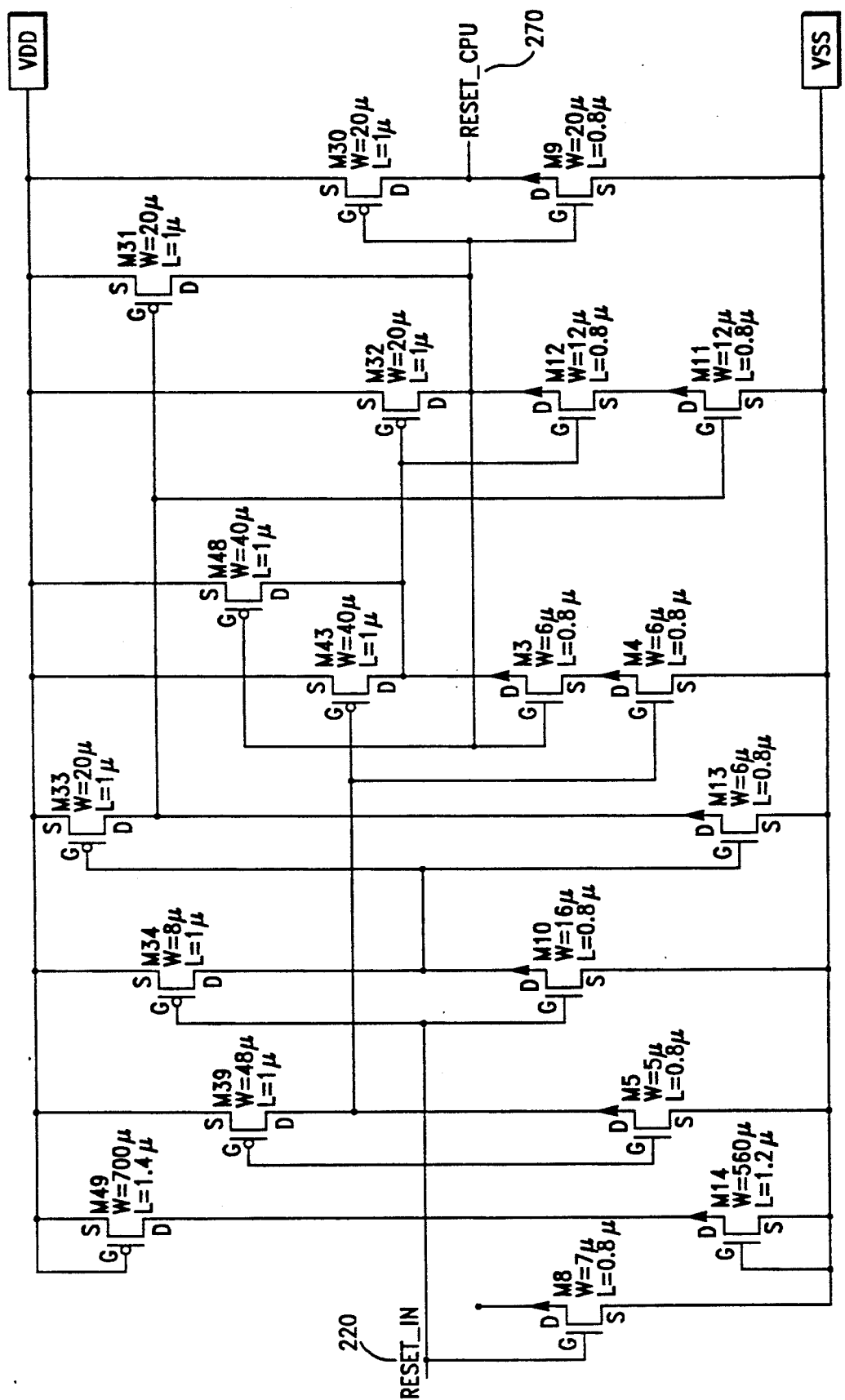
FIG. 5 is a schematic diagram of buffer 260.

Although the structure and operation of buffers 250 and 260 are well known in the art, a schematic diagram of the two buffers used in a preferred embodiment is shown in FIGS. 4 and 5, respectively.

While the invention has been particularly shown and described with reference to preferred embodiments thereof, it will be understood by those skilled in the art that various changes in form and details may be made therein without departing from the spirit and scope of the invention.

What is claimed is:

1. A reset circuit for resetting at least a first and second device, the circuit comprising:
    (a) a first buffer with a first threshold voltage level, the input of said first buffer being connected to a reset signal and the output of said first buffer being connected to trigger the reset function of at lease one first device; and
    (b) a second buffer with a second threshold voltage level that is higher than said first threshold voltage level, the input of said second buffer being connected to said reset signal and the output of said second buffer being connected to trigger the reset function of a second device;
   wherein said first buffer and said second buffer are located within said second device.

2. The circuit of claim 1, wherein said second device is a central processing unit.

3. A circuit for resetting a system having a processor and at least one chip peripheral to said processor, wherein said system comprises:
    (i) a first buffer with a first threshold voltage level, the input of said first buffer being connected to a reset signal and the output of said first buffer being connected to trigger the reset function of said at least one; and
    (ii) a second buffer with a second threshold voltage level that is higher than said first threshold voltage level, the input of said second buffer being connected to said reset signal and the output of said second buffer being connected to trigger the reset function of said processor;
   wherein said first buffer and said second buffer are located within said processor.

4. The system of claim 3, further comprising a third buffer connected between the output of said first buffer and said at least one peripheral, said third buffer provides isolation and increased fan-out so that said first buffer can drive more peripherals.

5. A method for resetting a microprocessor system, comprising the steps of:
    (1) receiving a single reset signal; and
    (2) generating, within a processor, a peripheral chip reset signal and a processor reset signal from said single reset signal, wherein said peripheral chip reset signal activates the reset circuitry of the devices peripheral to said processor before activating the reset circuitry of said processor.

6. The method of claim 4, wherein said generating step further comprises the steps of:
    (a) providing the output of a first buffer with a first threshold voltage level to the devices peripheral to said processor, said output of said first buffer being said peripheral chip reset signal; and
    (b) providing the output of a second buffer with a second threshold voltage level to said processor, wherein said second threshold is higher than said first threshold voltage level, said output of said second buffer being said processor reset signal.

* * * * *

UNITED STATES PATENT AND TRADEMARK OFFICE
CERTIFICATE OF CORRECTION

PATENT NO. : 5,297,287
DATED : March 22, 1994
INVENTOR(S) : Miyayama et al.

It is certified that error appears in the above-indentified patent and that said Letters Patent is hereby corrected as shown below:

Column 2, line 8, replace "10" with --110--.
Column 2, line 30, delete "Initialization" and insert therefor --initialization--.
Column 4, line 15, after "one" insert --peripheral--.
Column 4, line 36, after "of" delete the word "the".
Column 4, lines 37-38, delete "activating the" and insert therefor --said processor--.
Column 4, line 38, after "reset" insert --signal activates the reset --.

Signed and Sealed this

Fourth Day of October, 1994

Attest:

BRUCE LEHMAN

Attesting Officer

Commissioner of Patents and Trademarks